United States Patent [19]

Nawa et al.

[11] Patent Number: 5,784,222
[45] Date of Patent: Jul. 21, 1998

[54] MAGNETIC RECORDING/REPRODUCING APPARATUS HAVING A PLASTIC CHASSIS IN WHICH A BOTTOM PLATE AND SIDE WALLS ARE INTEGRALLY FORMED

[75] Inventors: Ikuichiro Nawa; Koichi Shimoyama; Masafumi Ishizuki; Keiichi Setsumasa, all of Atsugi, Japan

[73] Assignee: Mitsumi Electric Co., Ltd., Tokyo, Japan

[21] Appl. No.: 753,258

[22] Filed: Nov. 21, 1996

Related U.S. Application Data

[63] Continuation of Ser. No. 384,764, Feb. 7, 1995, abandoned.

[30] Foreign Application Priority Data

Feb. 8, 1994 [JP] Japan .................. 6-014524

[51] Int. Cl.⁶ .................. G11B 33/02
[52] U.S. Cl. .................. 360/96.5; 369/75.1
[58] Field of Search .................. 360/84, 85, 93, 360/95, 96.5, 96.6, 137; 369/75.1, 75.2, 77.1

[56] References Cited

U.S. PATENT DOCUMENTS

| | | | |
|---|---|---|---|
| 4,445,159 | 4/1984 | Nemoto et al. | 360/137 |
| 4,583,138 | 4/1986 | Imazaike | 360/85 |
| 4,785,364 | 11/1988 | Ando et al. | 360/96.5 |
| 4,831,472 | 5/1989 | Ando et al. | 360/96.5 |
| 4,841,394 | 6/1989 | Tomizawa et al. | 360/99.06 |
| 5,088,655 | 2/1992 | Nakanishi | 360/96.5 X |
| 5,233,490 | 8/1993 | Nakanishi | 360/96.5 |

FOREIGN PATENT DOCUMENTS

| | | |
|---|---|---|
| 55-160302 | 12/1980 | Japan . |
| 55-160303 | 12/1980 | Japan . |
| 55-160304 | 12/1980 | Japan . |
| 4-49560 | 2/1992 | Japan . |

*Primary Examiner*—Robert S. Tupper
*Assistant Examiner*—William J. Klimowicz
*Attorney, Agent, or Firm*—Michael N. Meller

[57] ABSTRACT

There is provided a magnetic recording/reproducing apparatus using a plastic chassis having side walls integrally formed with a bottom plate. A cassette holder holding the cassette case moves between a loaded position and an ejected position. A pair of pins are protrudingly provided on side surfaces of the cassette holder. One pin of the pair of pins is provided on a left side surface, and the other pin is provided on a right side surface. The plastic chassis has a bottom plate and left and right side walls formed perpendicularly on the left side and the right side of the bottom plate. The bottom plate and the left and right side walls are integrally formed with each other. A pair of slots are formed on the left and right side walls, one slot of the pair of slots being formed on the left side wall, the other slot being formed on the right side wall. The cassette holder is movably supported by the pins being inserted into the respective slots between the left side wall and the right side wall. A movement of the cassette holder is guided by the slots in extending directions of the slots.

6 Claims, 4 Drawing Sheets

MAGNETIC RECORDING/REPRODUCING APPARATUS HAVING A PLASTIC CHASSIS IN WHICH A BOTTOM PLATE AND SIDE WALLS ARE INTEGRALLY FORMED

This application is a continuation of Ser. No. 08/384,764 filed Feb. 7, 1995, now abandoned.

BACKGROUND OF THE INVENTION

The present invention generally relates to a chassis made of plastics used for magnetic recording/reproducing apparatus, and more particularly to a plastic chassis of which bottom plate and side walls are integrally formed, a cassette holder being movably supported between the side walls.

In conventional magnetic recording/reproducing apparatus such as video cassette tape recorders and digital audio cassette tape recorders, it is well known to mount mechanical parts, such as a cassette loading mechanism, a cassette tape loading/unloading mechanism and a tape driving mechanism, on a chassis.

A conventional chassis is formed by aluminum die casting because of aluminum's rigidity and light weight. In order to mount the above-mentioned mechanical parts on the chassis, a pin is press fitted to the chassis, and a metal plate having a shaft thereon is mounted on the chassis.

In the cassette tape loading/unloading mechanism, a cassette holder is incorporated so as to accommodate the cassette tape and move it to a tape loading position. The cassette holder moves in a horizontal direction and a vertical direction. That is, when the cassette tape is inserted into the cassette holder, the cassette holder moves first in the horizontal direction to move the cassette tape inside the apparatus, and the cassette holder then moves downward to move the cassette tape to the tape loading position.

In order to guide a series of movements of the cassette holder, guiding slots are formed on left and right walls of the chassis. Pins are protrudingly provided on left and right surfaces of the cassette holder, the pins being inserted into the corresponding slots formed on the side walls of the chassis. Accordingly the cassette holder is supported between the side walls via the pins, and thus the cassette holder is movable in a direction along which the slots are extended. In other words, the movement of the cassette holder is guided in predetermined directions by a mechanism in which the pins are provided on the cassette holder and the slots are provided in the side walls of the chassis.

In the conventional cassette tape loading/unloading mechanism, in order to insert the left and right pins into the corresponding slots formed on the side walls, an assembly method is used in which one of the left and right walls is fixed to a bottom plate of the chassis, and then the pins corresponding to the fixed side wall are inserted into the slots formed on the fixed side wall, and then the other side wall is fixed on the bottom plate while the pins corresponding to the other side wall are inserted into the slots formed on the other side wall. That is, if both of the side walls were initially formed on the bottom plate of the chassis, the cassette holder could not be positioned between the side walls because the pins would interfere with the side walls, and therefore the side walls are provided as a separate part from the bottom plate of the chassis.

The side walls of the chassis may be integrally formed with the bottom plate of the chassis by using aluminum die casting. However, there is a problem in that the above-mentioned slots cannot be formed on the side walls with a desired accuracy by an aluminum die casting process, and thus even if the side walls were integrally formed with the bottom plate, additional parts would be required to provide the slots, or an additional machining of the slots on the side walls would be required.

As mentioned above, because the bottom plate and the side walls in the prior art are separate parts, the number of parts of the conventional chassis is increased, and thus the number of assembly processes are also increased. Accordingly, there is a problem that a manufacturing cost of the chassis is high.

SUMMARY OF THE INVENTION

It is a general object of the present invention to provide an improved and useful magnetic recording/reproducing apparatus in which the above-mentioned problems are eliminated.

A more specific object of the present invention is to provide a magnetic recording/reproducing apparatus using a plastic chassis having side walls integrally formed with a bottom plate.

In order to achieve the above-mentioned objects, there is provided according to the present invention, a magnetic recording/reproducing apparatus in which a recording medium accommodated in a cassette case is moved between a loaded position and an ejected position, the magnetic recording/reproducing apparatus comprising:

a cassette holder holding the cassette case and moving between the loaded position and the ejected position;

at least one pair of pins protrudingly provided on side surfaces of the cassette holder, one pin of the pair of pins being provided on a left side surface, the other pin of the pair of pins being provided on a right side surface;

a chassis, made of a plastic, having a bottom plate and left and right side walls being formed perpendicularly on the left side and the right side of the bottom plate, the bottom plate and the left and right side walls being integrally formed with each other; and at least one pair of slots formed on the left and right side walls, one slot of the pair of slots being formed on the left side wall, the other slot of the pair of slots being formed on the right side wall, the cassette holder being movably supported by the pins being inserted into the respective slots between the left side wall and the right side wall, the movement of the cassette holder being guided by the slots in extending directions of the slots.

According to the present invention, since the chassis is formed by the bottom plate and the left and right side walls integrally formed with the bottom plate, the chassis is formed as a single part. Additionally, the slots are formed on the left and right side walls at the same time when the chassis is formed by plastic molding. Therefore, the number of parts need for forming the chassis is reduced, and parts needed for providing the slots guiding the cassette holder are eliminated.

Other objects, features and advantages of the present invention will become more apparent from the following detailed description when read in conjunction with the accompanying drawings.

BRIEF DESCRIPTION OF THE DRAWINGS

FIG. 1A is a left side view; FIG. 1B is a plan view; FIG. 1C is a front view;

DETAILED DESCRIPTION OF THE PREFERRED EMBODIMENT

Figure 1A:
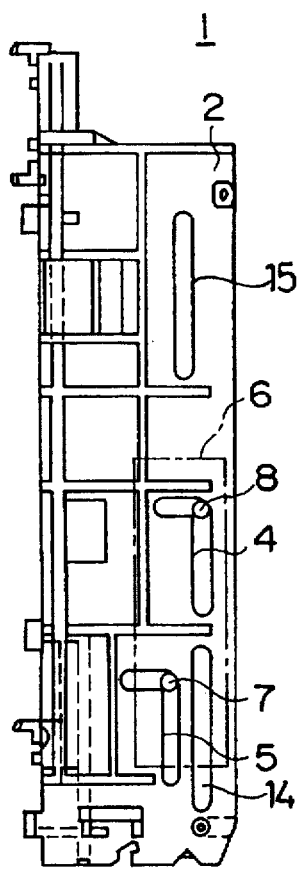
FIGS. 1A, 1B and 1C are views of a plastic chassis which is an essential part of an embodiment of a magnetic tape apparatus according to the present invention.
Figure 1B:
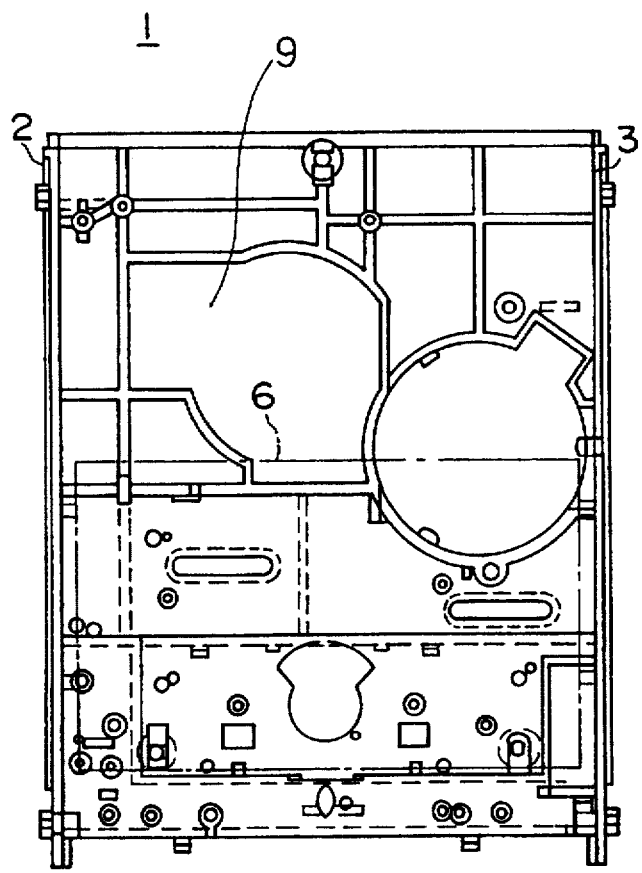
Figure 1C:
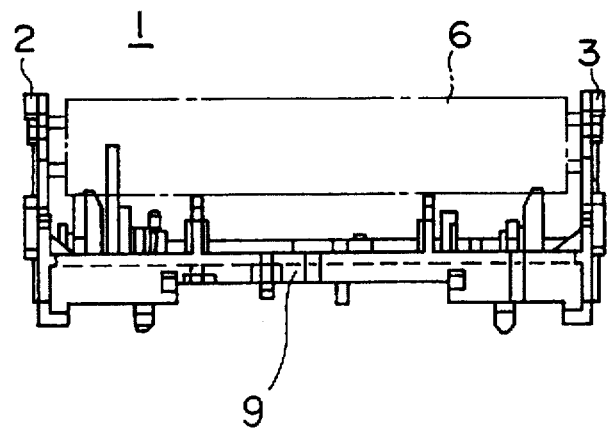

A description will now be given of an embodiment according to the present invention. FIGS. 1A, 1B and 1C are views of a plastic chassis which is an essential part of an embodiment of a magnetic tape apparatus according to the present invention; FIG. 1A is a left side view; FIG. 1B is a plan view; FIG. 1C is a front view.

In FIGS. 1A, 1B and 1C, a chassis 1 is used for a cassette tape apparatus, the chassis 1 being formed of a plastic, preferably polycarbonate or ABS resin, as a single part. Slots 4 and 5 used for guiding a cassette holder 6 (indicated by chain lines) are formed on a side wall 2 of the plastic chassis 1. Each of the slots 4 and 5 is formed, as shown in FIG. 1A, in an L-shape having a portion extending in a horizontal direction and a portion extending in a vertical direction. Similarly to the side wall 2, slots 4' and 5' (not shown in the figures) are formed in corresponding positions on a side wall 3. The slots 4 and 4' comprise a pair, and the slots 5 and 5' comprise another pair. It should be noted that only a left side wall 2 is shown in the drawings, for the sake of convenience, since the right side wall 3 has the same construction as the left side wall 2.

The pins 7 and 8, protrudingly provided on the side surface of the cassette holder 6, engage with the corresponding slots 5 and 4, and the pins 7' and 8' engage with the corresponding slots 5' and 4'. The pins 7 and 7' comprise a pair, and the pins 8 and 8' comprise another pair. A threaded hole is formed on an end of each of the pins 8 and 8'. The pins 7 and 7' are slightly longer than the pins 8 and 8'.

When a cassette tape (not shown in the figures) is inserted into the cassette holder 6, a cassette moving mechanism (not shown in the figures) is operated so as to move the cassette holder 6 far inside of the apparatus. In this operation, the cassette holder 6 is moved in a horizontal direction by being guided by the slots 4 and 5 formed on the side wall 2 and the slots 4' and 5' formed on the side wall 3, and thereafter moved downward so as to move the cassette tape to a loaded position.

In the present embodiment, a bottom plate 9 and the side walls 2 and 3 are integrally formed with each other to form the plastic chassis 1. The pair of slots 4 and 4' and the pair of slots 5 and 5' are formed at the same time that the chassis 1 is molded. Accordingly, the bottom plate 9 and the side walls 2 and 3 are formed into a single part, and no separate part to be mounted to the chassis 1 is needed to provide the slots 4, 4', 5 and 5'. Accordingly, a number of parts and a number of assembling processes of the cassette tape apparatus can be reduced, and thus a manufacturing cost of the cassette tape apparatus can be reduced.

Figure 2:
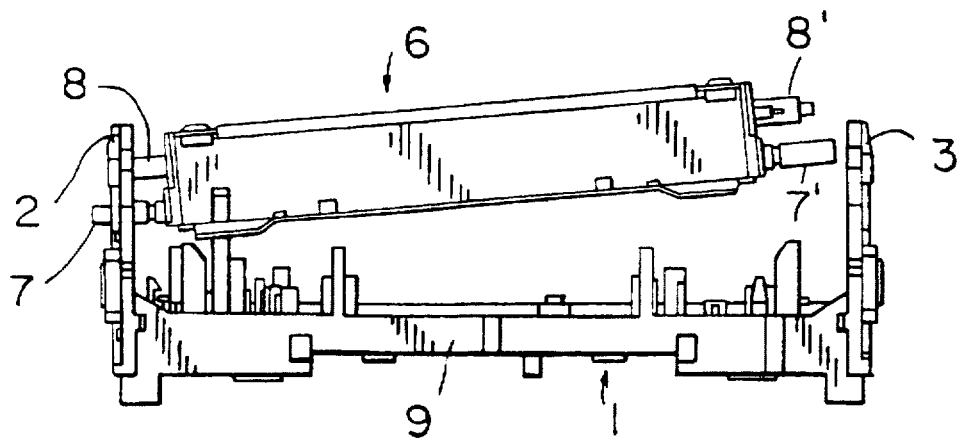
FIG. 2 is a front view for explaining an assembly process of a cassette holder with the chassis shown in FIGS. 1A, 1B and 1C.
Figure 3:
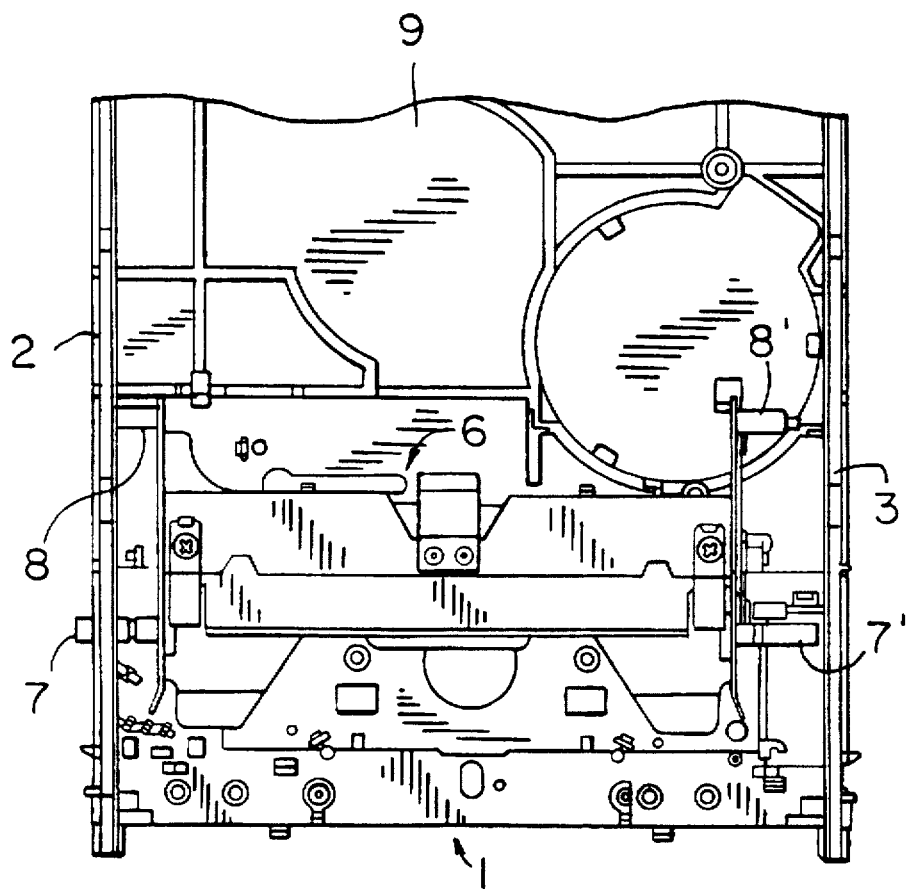
FIG. 3 is a plan view of a part of the chassis shown in FIGS. 1A, 1B and 1C for explaining an assembly process of a cassette holder with the chassis.
Figure 4:
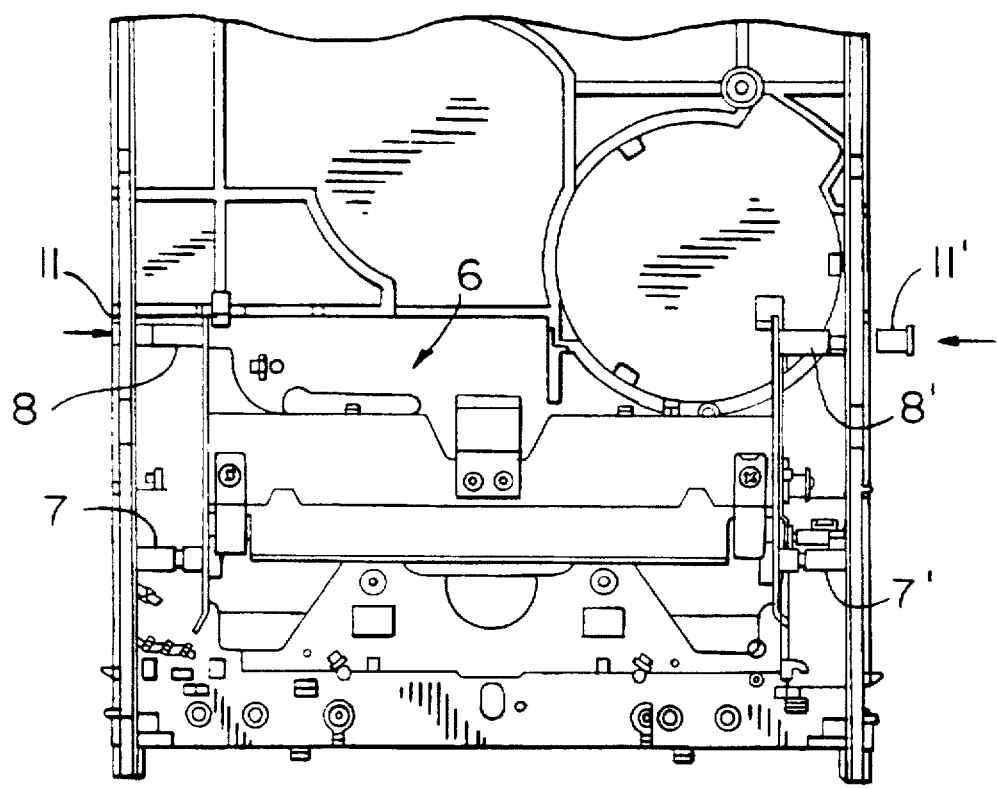
FIG. 4 is a plan view of a part of the chassis shown in FIGS. 1A, 1B and 1C for explaining an assembly process of a cassette holder with the chassis.

A description will now be given of an assembling method of the cassette holder with the plastic chassis 1. FIG. 2 is a view showing a process for positioning the cassette holder 6 between the side walls 2 and 3 of the chassis 1. FIGS. 3 and 4 show plan views of a part of the chassis 1 for explaining an assembly process of the cassette holder 6 with the chassis 1.

As shown in FIGS. 2 and 3, the pins 7 and 8 provided on the left side surface of the cassette holder 6 are inserted into the corresponding slots 5 and 4. At this time, the pins 7 and 8 are inserted into the slots 5 and 4 while the cassette holder 6 is inclined as shown in FIG. 2. An end of the pin 8 is provided with the threaded hole. After the pins 7 and 8 are sufficiently inserted, the cassette holder 6 is positioned horizontally, and, as shown in FIG. 4, a bushing 11 is fitted on the pin 8 so as to be fixed on the end of the pin 8 by means of a screw screwed into the threaded hole formed on the pin 8. Thereafter, a bushing 11' is inserted into the slot 4' from outside the side wall 3 so as to be fitted on the pin 8', and the bushing 11' is fixed on the end of the pin 8' in the same manner as for the pin 8 and the bushing 11. Each of the bushings 11 and 11' has a collar having a diameter greater than a width of the slots 4 and 4', and, thus, a movement of the cassette holder 6 between the side walls 2 and 3 in directions along the axis of the pins 11 and 11' is restricted.

As mentioned above, the cassette holder 6 is movably supported in the extending directions of the slots 4, 4', 5 and 5' between the side walls 2 and 3 by fixing the bushings 11 and 11' on the pins 8 and 8' from outside the side walls 2 and 3, respectively.

Figure 6:
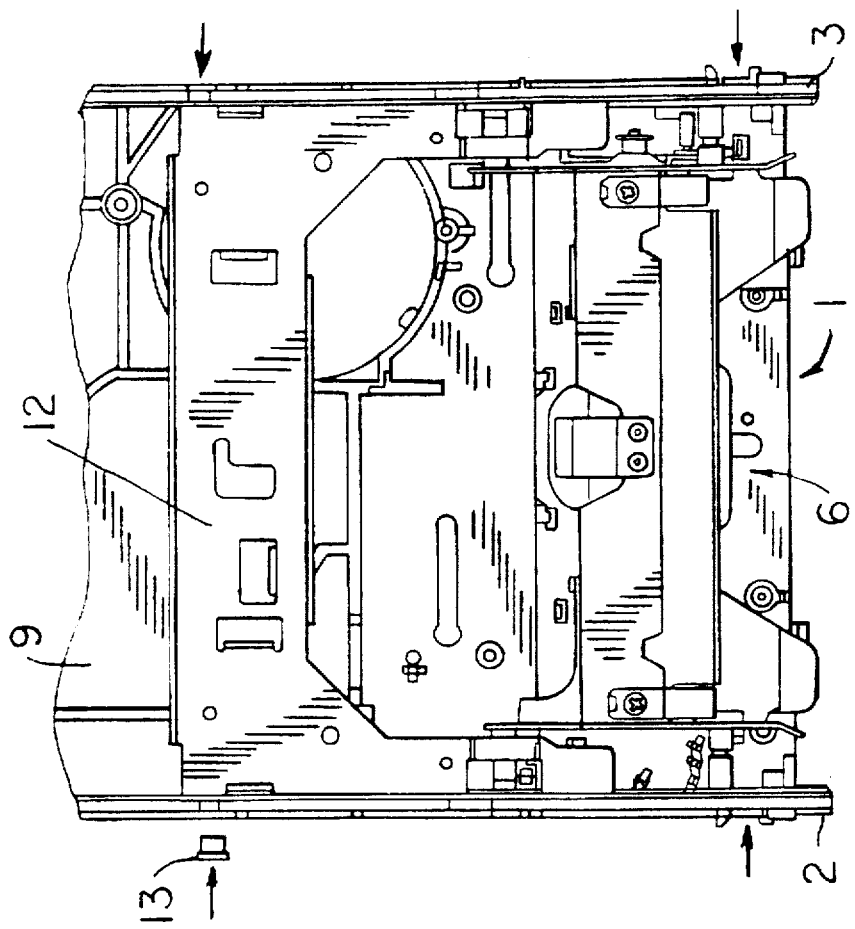
FIG. 6 is a plan view of a part of the chassis shown in FIGS. 1A, 1B and 1C in a state in which the cassette holder shown in FIG. 2 and the cam slider shown in FIG. 5 are assembled in the chassis shown in FIGS. 1A, 1B and 1C.
Figure 5:
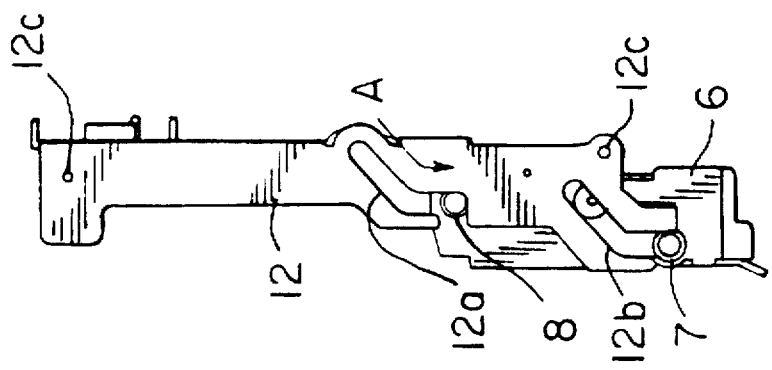
FIG. 5 is a view of a cam slider incorporated into the chassis shown in FIGS. 1A, 1B and 1C.

Thereafter, a cam slider 12 shown in FIGS. 5 and 6 is assembled from above the chassis 1. The cam slider 12 has, as shown in FIG. 5, slots 12a and 12b, an end of each of the slots 12a and 12b being open. The pins 7 and 8 are fitted on the corresponding open end of the slots 12a and 12b, and then the cam slider 12 is moved in a direction indicated by an arrow A in FIG. 5. In this state, bushings 13 are fixed to the cam slider 12 by means of screws screwed into threaded holes 12c from directions indicated by arrows in FIG. 6. The bushings 13 are fixed by passing through slots 14 and 15 formed on the side wall 2 shown in FIG. 1 and through slots 14' and 15' formed on the side wall 3 (not shown). Accordingly, the cam slider 12 is movable in a horizontal direction within the chassis 1.

The present invention is not limited to the specifically disclosed embodiment, and variations and modifications may be made without departing from the scope of the present invention.

What is claimed is:

1. A magnetic recording/reproducing apparatus in which a recording medium accommodated in a cassette case is moved between a loaded position and an ejected position, the magnetic recording/reproducing apparatus comprising:

a cassette holder holding the cassette case and moving between the loaded position and the ejected position;

at least one pair of pins protrudingly provided on side surfaces of said cassette holder, one pin of said pair of pins being provided on a left side surface, the other pin of said pair of pins being provided on a right side surface;

a chassis, made of a plastic composition, having a bottom plate and left and right side walls, said chassis being formed as a single unitary structure with said left and right side walls extending upright from said bottom plate to form a left upper edge and a right upper edge respectively; and having at least one pair of slots enclosed entirely in said left and right side walls with one slot of said pair of slots being formed on said left side wall and with the other slot of said pair of slots being formed on said right side wall, each of said at least one pair of slots having a portion extending in a horizontal direction and a portion extending downwardly in a vertical direction, wherein each slot of said at least one pair of slots being spaced apart from said left and right upper edges such that said left and right upper edges of said left and right side walls are inaccessible from said pair of slots for insertion of said pins;

means for securing said pins after insertion into the respective slots of said left side wall and said right side wall from the outside thereof into said left and right side walls respectively so as to restrict movement of said cassette holder between said left and right side walls whereby movement of said cassette holder is guided by said at least one pair of slots along said slot portions in said horizontal and vertical direction.

2. The magnetic recording/reproducing apparatus as claimed in claim 1, wherein a distance between ends of said pair of pins is greater than a distance between said left side wall and said right side wall.

3. The magnetic recording/reproducing apparatus as claimed in claim 1, wherein two pairs of said pins are provided on said left and right side surfaces of said cassette holder, and two pairs of said slots are provided on said left and right side walls.

4. The magnetic recording/reproducing apparatus as claimed in claim 3, wherein a bushing is fixed on an end of each pin of one pair of said pins from outside said chassis, said bushing having a collar having a diameter greater than a width of said slots.

5. The magnetic recording/reproducing apparatus as claimed in claim 4, wherein a threaded hole is formed on said end of each pin of said one pair of said pins, and said bushing is fixed by means of a screw screwed into said threaded hole, said screw being screwed from outside said chassis.

6. The magnetic recording/reproducing apparatus as claimed in claim 4, wherein a distance between ends of the other pair of said pins is greater than a distance between ends of said one pair of said pins.

* * * * *